United States Patent
Chang

(10) Patent No.: US 9,793,806 B2
(45) Date of Patent: Oct. 17, 2017

(54) SWITCHING DRIVER CAPABLE OF REDUCING EMI EFFECT AND POWER RIPPLE

(71) Applicant: ANPEC ELECTRONICS CORPORATION, Hsinchu (TW)

(72) Inventor: Ming-Hung Chang, Hsinchu County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 14/991,621

(22) Filed: Jan. 8, 2016

(65) Prior Publication Data

US 2017/0110962 A1 Apr. 20, 2017

(30) Foreign Application Priority Data

Oct. 14, 2015 (TW) .............................. 104133683 A

(51) Int. Cl.
| | |
|---|---|
| *H02M 3/158* | (2006.01) |
| *H02M 1/44* | (2007.01) |
| *H02M 1/14* | (2006.01) |
| *H02M 1/08* | (2006.01) |

(52) U.S. Cl.
CPC ............ *H02M 3/158* (2013.01); *H02M 1/14* (2013.01); *H02M 1/44* (2013.01); *H02M 1/08* (2013.01)

(58) Field of Classification Search
CPC .......... H02M 3/158; H02M 1/14; H02M 1/44; H02M 1/08; H02M 1/088; H02M 1/084; H02M 2001/0009; H02M 2001/0029; H02M 2001/0067; H02M 2001/0077; H02M 3/156; H02M 1/38; H02M 3/1584
See application file for complete search history.

(56) References Cited

U.S. PATENT DOCUMENTS

| | | | | |
|---|---|---|---|---|
| 2002/0101741 | A1* | 8/2002 | Brkovic ................... | H02M 1/08 363/16 |
| 2008/0278984 | A1* | 11/2008 | Stanley .................... | H02M 7/48 363/95 |
| 2011/0074376 | A1* | 3/2011 | Chen ........................ | H03F 3/217 323/283 |
| 2013/0088279 | A1* | 4/2013 | Shimano ............... | H03K 17/163 327/401 |

(Continued)

*Primary Examiner* — Gustavo Rosario Benitez
(74) *Attorney, Agent, or Firm* — Li & Cai Intellectual Property (USA) Office

(57) ABSTRACT

A switching driver capable of reducing EMI effect and power ripple is disclosed. When the switching driver wants to increase the voltage of an output end, a non-overlapping signal generator controls a low-side driver to quickly turn off a low-side switch, and detects an ascending slope of the voltage of the output end to control a cut-off velocity of a low-side auxiliary switch. When the switching driver wants to decrease the voltage of the output end, the non-overlapping signal generator controls a high-side driver to quickly turn off a high-side switch, and detects a descending slope of the voltage of the output end to control a cut-off velocity of a high-side auxiliary switch. As the descending slope becomes higher, the cut-off velocity of the high-side auxiliary switch becomes slower. Accordingly, the switching driver can reduce EMI effect and power ripple operating in a dead-time.

13 Claims, 7 Drawing Sheets

(56) References Cited

U.S. PATENT DOCUMENTS

| | | | |
|---|---|---|---|
| 2014/0001839 A1* | 1/2014 | Kakimoto | H02P 27/06 307/9.1 |
| 2014/0021932 A1* | 1/2014 | Ejury | G05F 3/02 323/311 |
| 2014/0176093 A1* | 6/2014 | Nomiyama | H02M 3/158 323/235 |
| 2014/0253186 A1* | 9/2014 | De Geeter | H03K 17/6871 327/110 |
| 2016/0268900 A1* | 9/2016 | Miyazaki | H02M 1/088 |

* cited by examiner

US 9,793,806 B2

SWITCHING DRIVER CAPABLE OF REDUCING EMI EFFECT AND POWER RIPPLE

BACKGROUND

1. Technical Field

The present invention relates to a switching driver, in particular, to a switching driver capable of reducing EMI effect and power ripple.

2. Description of Related Art

Because of the advantages of high efficiency, the switching driver is widely applied in class-D power amplifiers with high wattage, to provide high current to a load. The class-D power amplifier adopts the switching driver to modulate signals. However, it is easy to cause the problem of generating power ripple and EMI effect in the output end of the switching driver.

Please refer to FIG. 1, which shows a diagram of a traditional switching driver. As shown in FIG. 1, the switching driver 10 is used in a class-D power amplifier, which includes a non-overlapping signal generator 12, a high-side driver 14, a low-side driver 16, a high-side switch MH, and a low-side switch ML. The non-overlapping signal generator 12 generates a first non-overlapping signal S1 and a second non-overlapping signal S2 according to a pulse width control signal Sp, to avoid turning on the high-side switch MH and the low-side switch ML at the same time. In general, the pulse width control signal Sp is generated by the pulse-width modulator, to adjust the duty cycle of the first non-overlapping signal S1 and the second non-overlapping signal S2.

The high-side driver 14 generates a first switching signal Sup according to the first non-overlapping signal S1, to control the turning on and turning off of the high-side switch MH. The low-side driver 16 generates a second switching signal Sdn according to the second non-overlapping signal S2, to control the turning on and turning off of the low-side switch ML. An output end OUT is configured between the high-side switch MH and the low-side switch ML. The output end OUT outputs an output signal So to a load 19 according to a power voltage VDD.

In general, this may cause the leakage current of low impedance from the power end to the ground end because of turning on the high-side switch MH and the low-side switch ML at the same time. In order to avoid the leakage current, the non-overlapping signal generator 12 simultaneously turns off the high-side switch MH and the low-side switch ML for a period of time (called dead-time) before turning on the high-side switch MH or the low-side switch ML, to cause the output end OUT to be operating in a high impedance state. If the load 19 is an inductive load (e.g., a speaker), the output end OUT suffers from the influence of the load current, to increase the output signal So (see FIG. 1) (i.e., the load current flowing in the output end OUT) or decrease the output signal So (i.e., the load current flowing out the output end OUT) during the dead-time. The load current becomes higher, and the slope of the output signal So of the output end OUT becomes higher, thereby causing EMI effect.

Even if the high-side switch MH and the low-side switch ML are turned off during the dead-time, the parasitic diodes of the high-side switch MH and the low-side switch ML are turned on by the load current, so that the voltage of the output end OUT is higher than the voltage of the power end or lower than the voltage of the ground end, to cause power ripple.

For example, please refer to FIG. 2 in conjunction with FIG. 1. When the pulse width control signal Sp is converted from the low level to the high level, the switching driver 10 may enter a period of dead-time DT1. During the dead-time DT1, the first non-overlapping signal S1 stays low level, and the second non-overlapping signal S2 is converted from the high level to the low level. At this time, the gate voltage Vgsu of the high-side switch MH is lower than the turn-on voltage, to keep the high-side switch MH in off state. The gate voltage Vgsd of the low-side switch ML decreases from a high voltage to less than the turn-on voltage, to turn off the low-side switch ML. So that the high-side switch MH and the low-side switch ML are off during the dead-time DT1. In this period, when the load current flows into the output end OUT, the output signal So of the output end OUT increases quickly (e.g., the period SR1 shown in FIG. 2) until the parasitic diode of the high-side switch MH turned on. The load current finally flows into the power voltage VDD and disturbs it. The output end OUT with fast slew rate and high frequency oscillation generates EMI in period DT1 shown in FIG. 2 until the high-side switch MH is turned on completely.

Similarly, when the pulse width control signal Sp is converted from the high level to the low level, the switching driver 10 may enter a period of dead-time DT2. During the dead-time DT2, the high-side switch MH and the low-side switch ML are turned off. In this period, when the load current flows out the output end OUT, the output signal So of the output end OUT decreases quickly (e.g., the period SR2 shown in FIG. 2) until the parasitic diode of the low-side switch ML turned on. The load current finally flows from ground and disturbs it. The output end OUT with fast slew rate and high frequency oscillation generates EMI in period DT2 shown in FIG. 2 until the low-side switch ML is turned on completely.

Therefore, how to reduce EMI effect and power ripple generated from the switching driver 10 operating in the dead-time has become a major issue.

SUMMARY

An exemplary embodiment of the present disclosure provides a switching driver capable of reducing EMI effect and power ripple. The switching driver is coupled to a load through an output end. The switching driver includes a non-overlapping signal generator, a high-side switch, a high-side auxiliary switch, a low-side switch, a low-side auxiliary switch, a high-side driver, and a low-side driver. The non-overlapping signal generator is configured for generating a high-side signal and a low-side signal according to a pulse width control signal. The high-side switch is coupled between a power end and the output end. The high-side switch has a high-side control end. The high-side auxiliary switch is connected in parallel to the high-side switch. The high-side auxiliary switch has a high-side auxiliary control end. The low-side switch is coupled between the output end and a ground end. The low-side switch has a low-side control end. The low-side auxiliary switch is connected in parallel to the low-side switch. The low-side auxiliary switch has a low-side auxiliary control end. The high-side driver is coupled among the non-overlapping signal generator, the power end, the high-side control end, and the high-side auxiliary control end. The low-side driver is coupled among the non-overlapping signal generator, the output end, the low-side control end, and the low-side auxiliary control end. When the pulse width control signal is low level, the high-side driver turns off the high-side switch and the high-side auxiliary switch according to the high-side signal, the low-side driver turns on the low-side switch and the low-side auxiliary switch according to the low-side signal. When the pulse width control signal is converted from a high level to a low level, the high-side driver turns off the high-side switch and the high-side auxiliary switch for a dead-time, and simultaneously turns on the high-side switch and the high-side auxiliary switch after the dead-time according to the high-side signal, the low-side driver decreases the voltage of the low-side control end to less than a turn-on voltage to turn off the low-side switch according to the low-side signal, and detects an ascending slope of the voltage of the output end to control a cut-off velocity of the low-side auxiliary switch, and as the ascending slope becomes higher, the cut-off velocity of the low-side auxiliary switch becomes slower.

To sum up, the present disclosure provides a switch driver, which uses the turning on and turning off of the high-side switch, the high-side auxiliary switch, the low-side switch, and the low-side auxiliary switch, to reduce EMI effect and power ripple operating in the dead-time.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

Figure 1:
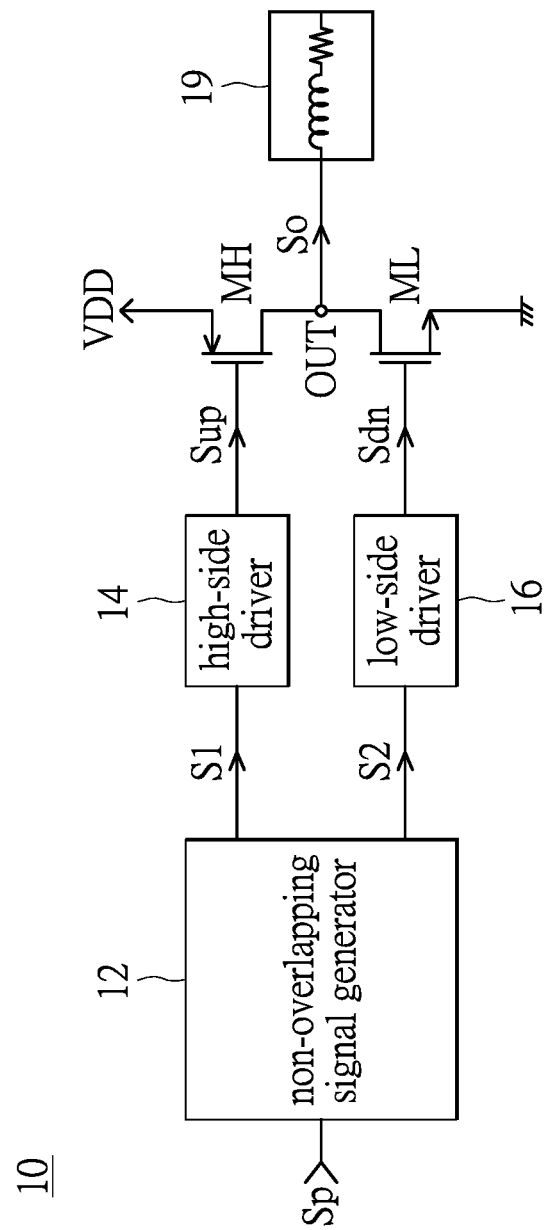
FIG. 1 shows a diagram of a traditional switching driver.
Figure 2:
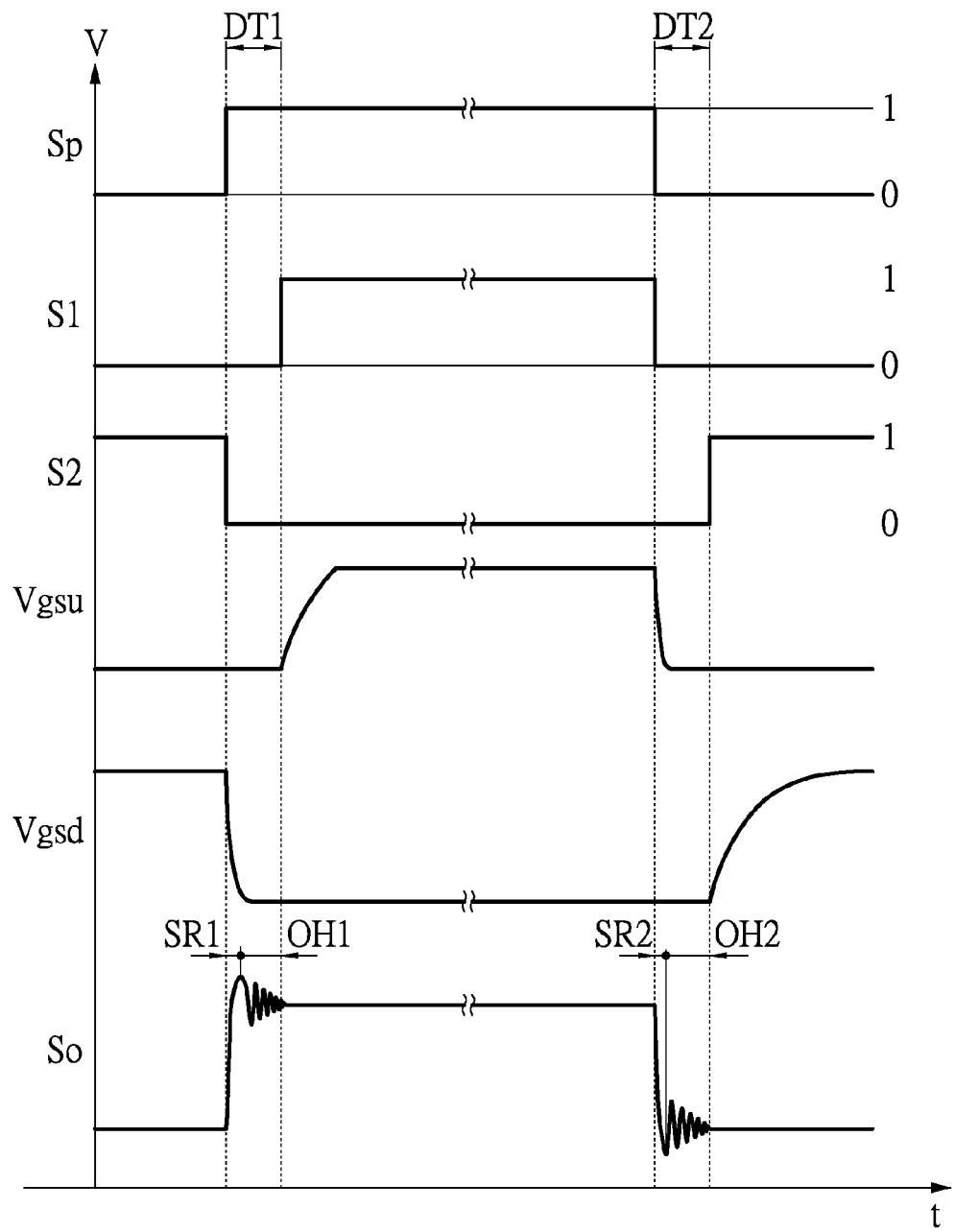
FIG. 2 shows a wave diagram of related signals of the switching driver shown in FIG. 1.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides a switching driver capable of reducing EMI effect and power ripple, which connects to a load through an output end. When the switching driver wants to increase the voltage of the output end, a low-side driver quickly turns off a low-side switch, and detects an ascending slope of the voltage of the output end to control a cut-off velocity of a low-side auxiliary switch. The ascending slope becomes higher, and the cut-off velocity becomes slower. When the switching driver wants to decrease the voltage of the output end, a high-side driver quickly turns off a high-side switch, and detects a descending slope of the voltage of the output end to control a cut-off velocity of a high-side auxiliary switch. The descending slope becomes higher, and the cut-off velocity becomes slower. Accordingly, the switching driver can reduce EMI effect and power ripple operating in a dead-time. The switching driver capable of reducing EMI effect and power ripple provided in the exemplary embodiment of the present disclosure will be described in the following paragraphs.

Figure 3:
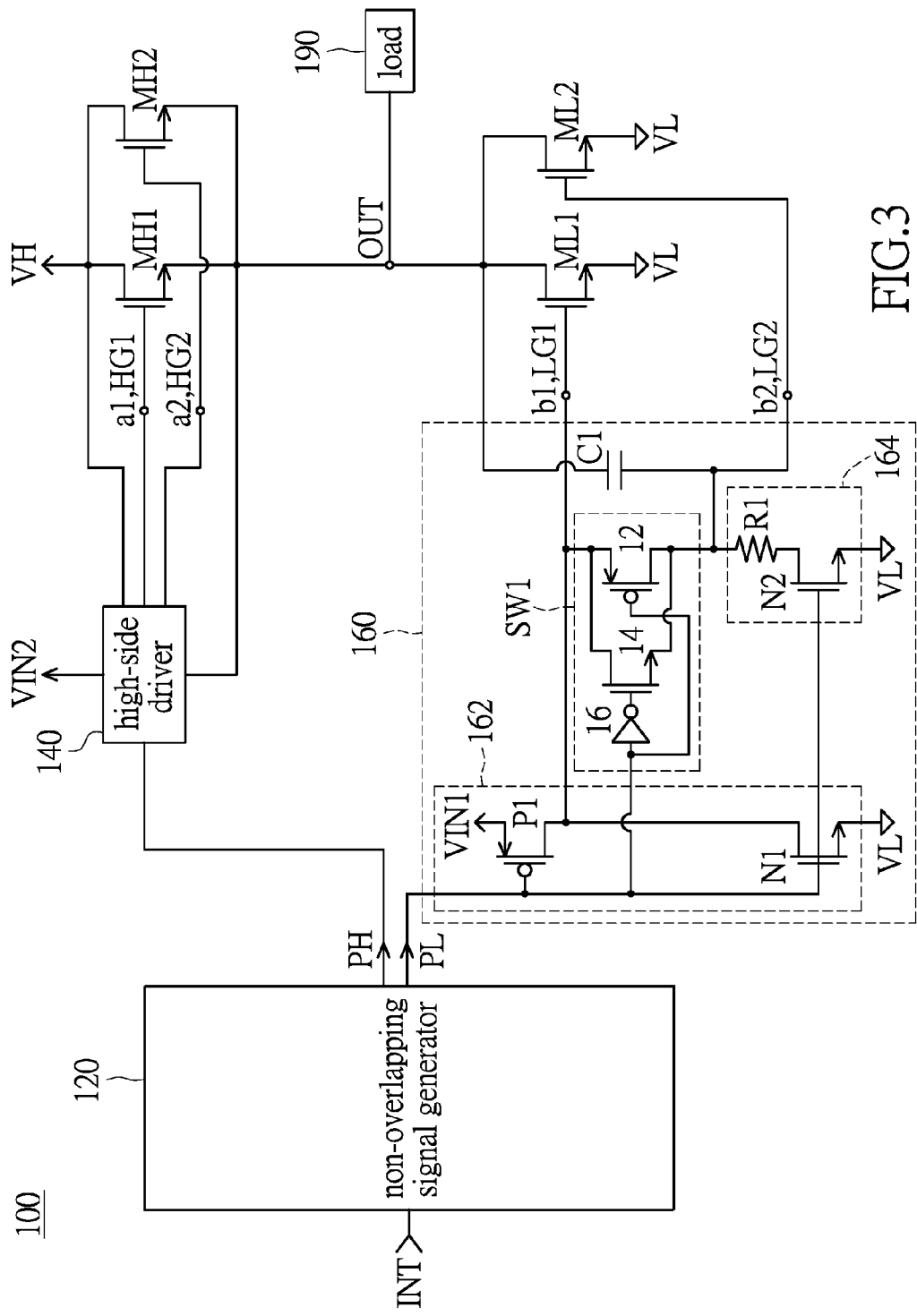
FIG. 3 shows a diagram of a switching driver according to an embodiment of the present disclosure.

Firstly, please refer to FIG. 3, which shows a diagram of a switching driver according to an embodiment of the present disclosure. As shown in FIG. 3, the switching driver 100 is coupled to a load 190 through an output end OUT. In the present disclosure, the load 190 is an inductive load (e.g., a speaker) and is applied in the class-D power amplifier with high wattage, so that the switching driver 100 provides high current to the load 190. The switching driver 100 includes a non-overlapping signal generator 120, a high-side switch MH1, a high-side auxiliary switch MH2, a low-side switch ML1, a low-side auxiliary switch ML2, a high-side driver 140, and a low-side driver 160.

The non-overlapping signal generator 120 generates a high-side signal PH and a low-side signal PL according to the pulse width control signal INT. In the present disclosure, the pulse width control signal INT is generated by the pulse width modulator, to adjust the duty cycle of the high-side signal PH and the low-side signal PL for controlling the turning on and turning off of the high-side switch MH1, the high-side auxiliary switch MH2, the low-side switch ML1, and the low-side auxiliary switch ML2. Persons of ordinary skill in this technology field should realize the operation of the pulse width modulator, so detailed description is omitted.

The high-side switch MH1 is coupled between a power end VH and an output end OUT. The high-side switch MH1 has a high-side control end a1. The high-side auxiliary switch MH2 is connected in parallel to the high-side switch MH1 (i.e., the high-side auxiliary switch MH2 is coupled between the power end VH and the output end OUT), and has a high-side auxiliary control end a2. The low-side switch ML1 is coupled between the output end OUT and a ground end VL, and has a low-side control end b1. The low-side auxiliary switch ML2 is connected in parallel to the low-side switch ML1 (i.e., the low-side auxiliary switch ML2 is coupled between the output end OUT and the ground end VL), and has a low-side auxiliary control end b2. In the present disclosure, the power end VH receives a high voltage, and the ground end VL receives a low voltage. The ground end VL can also connect to the ground and receives a ground voltage. The present disclosure is not limited thereto.

The high-side driver 140 is coupled among the non-overlapping signal generator 120, the power end VH, the high-side control end a1, and the high-side auxiliary control end a2. The high-side driver 140 respectively takes the voltage of the high-side high-voltage end VIN2 and the voltage of the output end OUT as the high voltage reference and the low voltage reference, to adjust the voltage HG1 of the high-side control end a1 and the voltage HG2 of the high-side auxiliary control end a2 according to the high-side signal PH. The high-side switch MH1 is turned on or turned off according to the voltage HG1 of the high-side control end a1. The high-side auxiliary switch MH2 is turned on or turned off according to the voltage HG2 of the high-side auxiliary control end a2.

The low-side driver 160 is coupled among the non-overlapping signal generator 120, the output end OUT, the low-side control end b1, and the low-side auxiliary control end b2. The low-side driver 160 respectively takes the voltage of the low-side high-voltage end VIN1 and the voltage of the ground end VL as the high voltage reference and the low voltage reference, to adjust the voltage LG1 of the low-side control end b1 and the voltage LG2 of the low-side auxiliary control end b2 according to the low-side signal PL. The low-side switch ML1 is turned on or turned off according to the voltage LG1 of the low-side control end b1. The low-side auxiliary switch ML2 is turned on or turned off according to the voltage LG2 of the low-side auxiliary control end b2.

Furthermore, the low-side driver 160 includes a first capacitor C1, a first low impedance element 162, a first high impedance element 164, and a first short switch SW1. The first capacitor C1 is coupled between the output end OUT and the low-side auxiliary control end b2. The first low impedance element 162 is coupled among the low-side high-voltage end VIN1, the low-side control end b1, and the ground end VL. The first low impedance element 162 controls the low-side control end b1 connected to the low-side high-voltage end VIN1 or connected to the ground end VL according to the low-side signal PL, to control the turning on and turning off of the low-side switch ML1. This means that when the first low impedance element 162 controls the low-side control end b1 to connect the low-side high-voltage end VIN1, the voltage LG1 of the low-side control end b1 increases. In turn, when the first low impedance element 162 controls the low-side control end b1 to connect the ground end VL, the voltage LG1 of the low-side control end b1 decreases.

In the present disclosure, the first low impedance element 162 has a first PMOS P1 and a first NMOS N1. The first PMOS P1 is coupled between the low-side high-voltage end VIN1 and the low-side control end b1. The first NMOS N1 is coupled between the low-side control end b1 and the ground end VL. Therefore, when the low-side signal PL is high level, the first PMOS P1 is turned off and the first NMOS is turned on, to connect the low-side control end b1 and the ground end VL for decreasing the voltage LG1 of the low-side control end b1. When the low-side signal PL is low level, the first NMOS N1 is turned off and the first PMOS P1 is turned on, to connect the low-side control end b1 and the low-side high-voltage end VIN1 for increasing the voltage LG1 of the low-side control end b1. The first low impedance element 162 can be composed of other circuits, and the present disclosure is not limited thereto.

The first high impedance element 164 is coupled between the low-side auxiliary control end b2 and the ground end VL. The first high impedance element 164 controls the low-side auxiliary control end b2 connected to the ground end VL according to the low-side signal PL, to control the turning on and turning off of the low-side auxiliary switch ML2. This means that when the first high impedance element 164 controls the low-side auxiliary control end b2 to connect the ground end VL, the voltage LG2 of the low-side auxiliary control end b2 decreases.

In the present disclosure, the first high impedance element 164 has a first resistor R1 and a second NMOS N2. An end of the first resistor R1 is coupled to the low-side auxiliary control end b2. Another end of the first resistor R1 is coupled to an end of the second NMOS N2. Another end of the NMOS N2 is coupled to the ground end VL. Therefore, when the low-side signal PL is the high level, the second NMOS N2 is turned on to connect the low-side auxiliary control end b2 and the ground end VL for decreasing the voltage LG2 of the low-side auxiliary control end b2. When the low-side signal PL is the low level, the second NMOS N2 is turned off to cut-off the low-side auxiliary control end b2 from the ground end VL.

In another disclosure, the first high impedance element 164 has the second NMOS N2 only (i.e., removing the first resistor R1). At present, the impedance of the second NMOS N2 is higher than the impedance of the first NMOS N1. Therefore, when the low-side signal PL is the high level, the second NMOS N2 is turned on to connect the low-side auxiliary control end b2 and the ground end VL for decreasing the voltage LG2 of the low-side auxiliary control end b2. When the low-side signal PL is the low level, the second NMOS N2 is turned off to cut-off the low-side auxiliary control end b2 and the ground end VL. The first high impedance element 164 can also be composed of other circuits, and the present disclosure is not limited thereto.

It is worth to note that the impedance of the second NMOS N2 is set higher than the impedance of the first NMOS N1. Therefore, when the low signal PL is converted from the low level to the high level, the first NMOS N1 and the second NMOS are turned on, to quickly decrease the voltage LG1 of the low-side control end b1 to less than the turn-on voltage, so as to completely turn off the low-side switch ML1. The low-side driver 160 detects the ascending slope of the voltage of the output end OUT through the first capacitor C1, to control the cut-off velocity of the low-side auxiliary switch ML2. The ascending slope becomes higher, and the cut-off velocity becomes slower. Accordingly, when the low-side signal PL is converted from the low level to the high level, the low-side switch ML1 and the low-side auxiliary switch ML2 are turned off at different velocity.

The first short switch SW1 is coupled between the low-side control end b1 and the low-side auxiliary control end b2, to adjust the voltage LG1 of the low-side control end b1 and the voltage LG2 of the low-side auxiliary control end b2 according to the low-side signal PL. When the low-side signal PL is the high level, the first short switch SW1 is turned off, so that the low-side switch ML1 and the low-side auxiliary switch ML2 are turned off at different velocity. Otherwise, when the low-side signal PL is the low level, the first short switch SW1 is turned on, so that the low-side switch ML1 and the low-side auxiliary switch ML2 are turned on at same velocity. In the present disclosure, the first short switch SW1 is composed of the PMOS 12, NMOS 14, and NOT gate 16. An end of the PMOS 12 is electrically connected to the low-side control end b1. Another end of the PMOS 12 is electrically connected to the low-side auxiliary control end b2. A control end of the PMOS 12 is electrically connected to the non-overlapping signal generator 120. An end of the NMOS 14 is electrically connected to the low-side control end b1. Another end of the NMOS 14 is electrically connected to the low-side auxiliary control end b2. A control end of the NMOS 14 is electrically connected to the non-overlapping signal generator 120 through a NOT gate 16. Therefore, when the low-side signal PL is the high level, the PMOS 12 and the NMOS 14 are turned off, so that the low-side switch ML1 and the low-side auxiliary switch ML2 are turned off at different velocity. Otherwise, when the low-side signal PL is the low level, the PMOS 12 and the NMOS 14 are turned on, so that the low-side switch ML1 and the low-side auxiliary switch ML2 are turned on at same velocity. The first short switch SW1 can also be composed of other circuits, and the present disclosure is not limited thereto.

Figure 4:
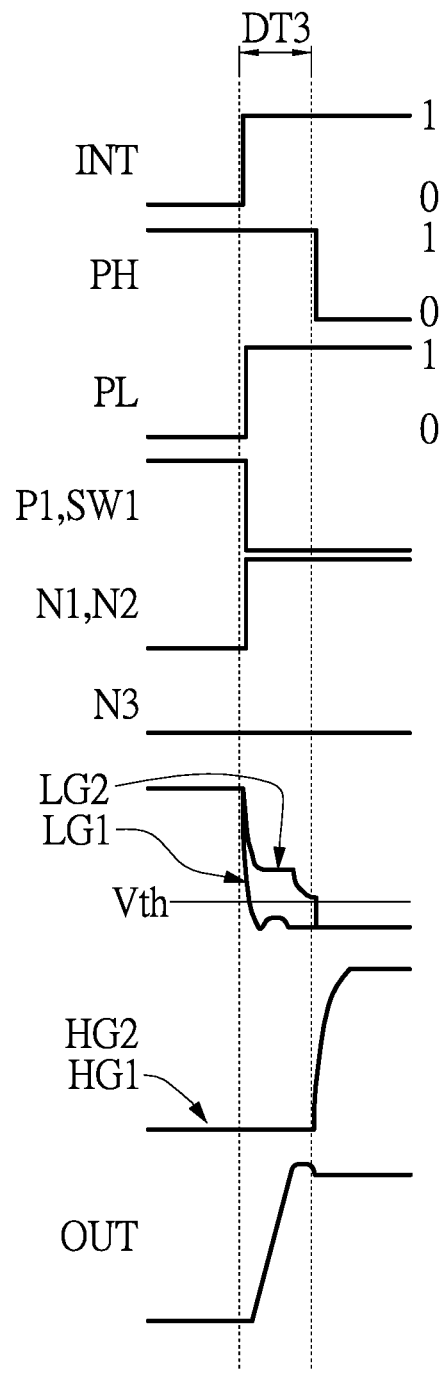
FIG. 4 shows a wave diagram of related signals of the switching driver shown in FIG. 3.

The low-side driver 160 controlling the turning on and turning off of the low-side switch ML1 and the low-side auxiliary switch ML2 while the pulse width control signal is at the low level or while the pulse width control signal is converted from the low level to the high level will be described in the following paragraph. Please refer to FIG. 4, which shows a wave diagram of related signals of the switching driver shown in FIG. 3. As shown in FIG. 4, when the pulse width control signal INT is the low level, the non-overlapping signal generator 120 generates the high-side signal PH with the high level and the low-side signal PL with the low level. The high-side driver 140 turns off the high-side switch MH1 and the high-side auxiliary switch MH2 according to the high-side signal PH. The low-side driver 160 turns on the low-side switch ML1 and the low-side auxiliary switch ML2 according to the low-side signal PL. More specifically, the first PMOS P1 and the first short switch SW1 are turned on according to the low-side signal PL with the low level for increasing the voltage LG1 of the low-side control end b1 and the voltage LG2 of the low-side auxiliary control end b2, so as to turn on the low-side switch ML1 and the low-side auxiliary switch ML2. At present, the voltage of the output end OUT is decreased to the low voltage of the ground end VL (e.g., 0V).

When the pulse width control signal INT is converted from the low level to the high level, the non-overlapping signal generator 120 keeps generating the high-side signal PH with the high level and changes to generate the low-side signal PL with the high level. The high-side driver 140 turns off the high-side switch MH1 and the high-side auxiliary switch MH2 for a dead-time DT3, and simultaneously turns on the high-side switch MH1 and the high-side auxiliary switch MH2 after the dead-time DT3 according to the high-side signal PH. The low-side driver 160 rapidly decreases the voltage of the low-side control end b1 to less than a turn-on voltage according to the low-side signal PL, to turn off the low-side switch ML1. Then the low-side driver 160 detects the ascending slope of the voltage of the output end OUT through the first capacitor C1, to control the cut-off velocity of the low-side auxiliary switch ML2. As the ascending slope becomes higher, the cut-off velocity becomes slower. It means that the velocity of gradually turning off the low-side auxiliary switch ML2 is related to the ascending slope of the voltage of the output end OUT.

More specifically, when the pulse width control signal INT is converted from the low level to the high level, the first NMOS N1 of the first low impedance element 162 and the second NMOS N2 of the first high impedance element 164 are turned on according to the low-side signal PL with the high level. At this time, the ground end VL connects the low-side control end b1 to quickly decrease the voltage LG1 of the low-side control end b1 to a low voltage. The ground end VL connects the low-side auxiliary control end b2 to gradually decrease the voltage LG2 of the low-side auxiliary control end b2 through the current of the first capacitor C1.

It is worth to note that the voltage LG1 of the low-side control end b1 quickly decreases to the low voltage, to turn off the low-side switch ML1 during the dead-time DT3. At this time, the equivalent impedance of the low-side switch ML1 substantially increases. It is not enough to support the load current flowing into the output end OUT. Therefore, the output end OUT will be charged by the load current to quickly increase. The ascending slope of the voltage of the output end OUT will be detected by the first capacitor C1, to influence the descending velocity of the voltage LG2 of the low-side auxiliary control end b2. At this time, the low-side auxiliary switch ML2 has still not completely turned off, so as to provide the discharge path of the portion current and a resistive load for consuming energy in the parasitic LC network of the output end OUT. Accordingly, the voltage of the output end OUT increases to the high voltage of the power end VH at relatively low velocity (i.e., the voltage of the output end OUT generate less EMI effect because of the slower slew rate) and the high frequency oscillation at the output end OUT can also be inhibited.

In addition, the first short switch SW1 could be turned on during the low-side signal PL, to be converted from the high level to the low level (similar to that shown for SW1' in FIG. 7), which would mean that when the pulse width control signal INT is converted from the high level to the low level, the first short switch SW1 is turned off for the dead-time DT4 and then turned on (not shown in FIGs), to simultaneously raise the voltage LG1 of the low-side control end b1 and the voltage LG2 of the low-side auxiliary control end b2, so as to simultaneously turn on the low-side switch ML1 and the low-side auxiliary switch ML2. Accordingly, the first short switch SW1 can ensure that the low-side switch ML1 and the low-side auxiliary switch ML2 are simultaneously turned on. This means that the low-side switch ML1 and the low-side auxiliary switch ML2 are simultaneously turned on after the pulse width control signal INT is converted from the high level to the low level and keep the low level for a dead-time.

Figure 5:
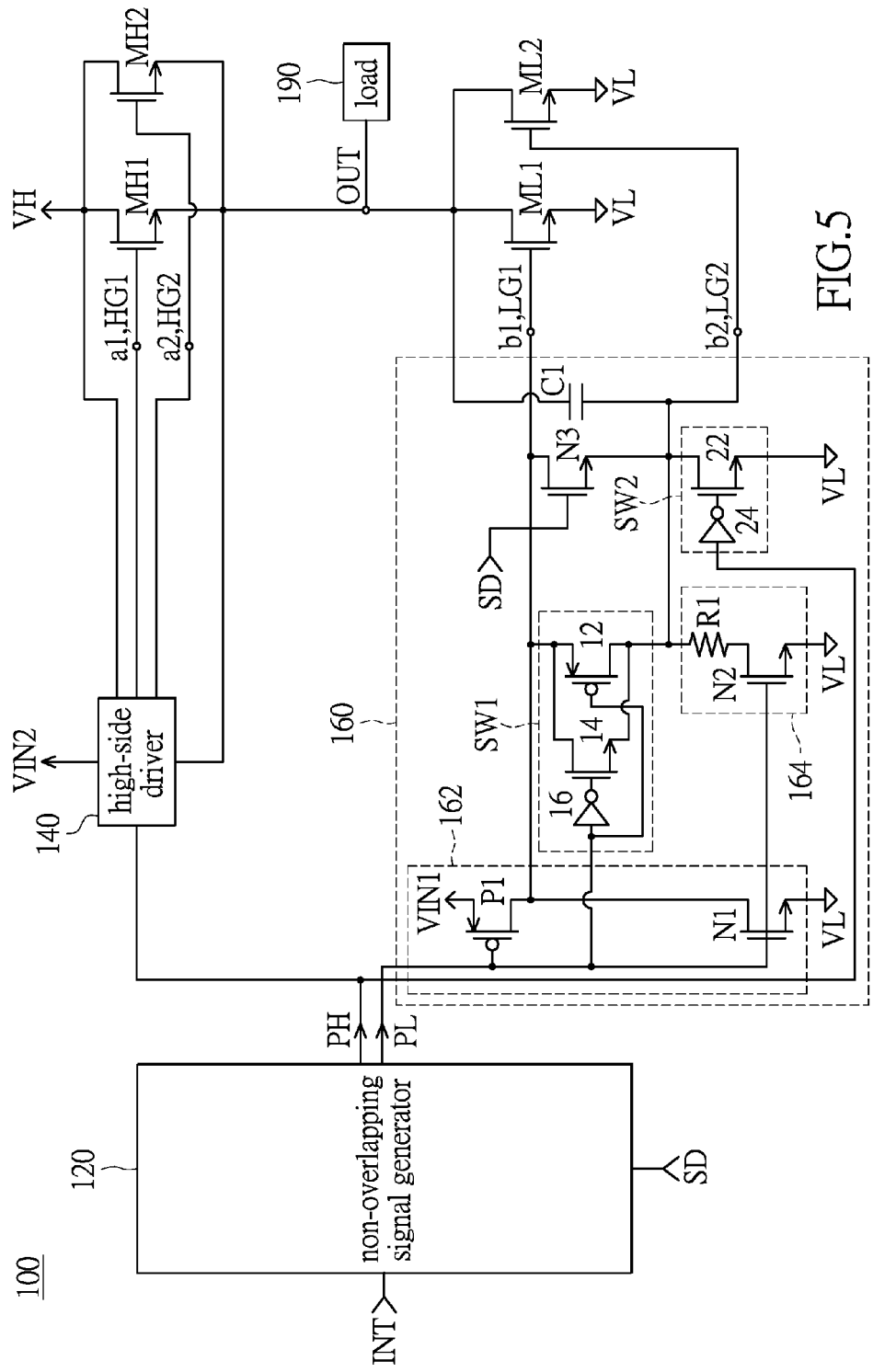
FIG. 5 shows a diagram of a switching driver according to another embodiment of the present disclosure.

In the present disclosure, the low-side driver 160 includes a first auxiliary cut-off switch SW2. The first auxiliary cut-off switch SW2 is coupled between the low-side auxiliary control end b2 and the ground end VL. As shown in FIG. 5, after the pulse width control signal INT is converted from the low level to the high level and keeps the high level for the dead-time, the first auxiliary cut-off switch SW2 is turned on according to the high-side signal PH with the low level, to decrease the voltage LG2 of the low-side auxiliary control end b2 to the low voltage of the ground end VL for turning off the low-side auxiliary switch ML2. In the present disclosure, the first auxiliary cut-off switch SW2 is composed of NMOS 22 and NOT gate 24. An end of the NMOS 22 is electrically connected to the low-side auxiliary control end b2. Another end of the NMOS 22 is electrically connected to the ground end VL. A control end of the NMOS 22 is electrically connected to the non-overlapping signal generator 120 through the NOT gate 24. Therefore, after the pulse width control signal INT is converted from the low level to the high level and keeps the high level for the dead-time DT3, the NMOS 22 is turned on according to the high-side signal PH with the low level, to turn off the low-side auxiliary switch ML2. The first auxiliary cut-off switch SW2 can be composed of other circuits, and the present disclosure is not limited thereto.

Accordingly, when the high-side driver 140 turns on the high-side switch MH1 and the high-side auxiliary switch MH2 (i.e., after the dead-time DT3), the first auxiliary cut-off switch SW2 can avoid that the low-side auxiliary switch ML2 still operating in the turn-on state, causing the shoot-through current from the power end VH to the ground end VL.

In other disclosures, the low-side driver circuit 160 includes a first protection switch N3. The first protection switch N3 is coupled between the low-side control end b1 and the low-side auxiliary control end b2, to simultaneously turn off the low-side switch ML1 and the low-side auxiliary switch ML2 according to a close signal SD. In the present disclosure, the close signal SD is generated from the abnormal condition of the system, such as the shutdown signal, the overcurrent signal, the overvoltage signal, or over-temperature protection. Therefore, when the abnormal condition occurs to the system, the close signal SD is converted to the high level, the non-overlapping signal generator 120 generates the high-side signal PH with high level and the low-side signal PL with high level according to the close signal SD with high level, to turn off the low-side switch ML1 and the low-side auxiliary switch ML2. At present, the first protection switch N3 is turned on according to the close signal SD with high level, so that the voltage LG1 of the low-side control end b1 and the voltage LG2 of the low-side auxiliary control end b2 quickly decrease to less than the cut-off voltage by the same velocity through the first NMOS N1 configured in the low impedance path. Therefore, when the abnormal condition occurs, the switching driver 100 turns off the low-side switch ML1 and the low-side auxiliary switch ML2 immediately.

Figure 6:
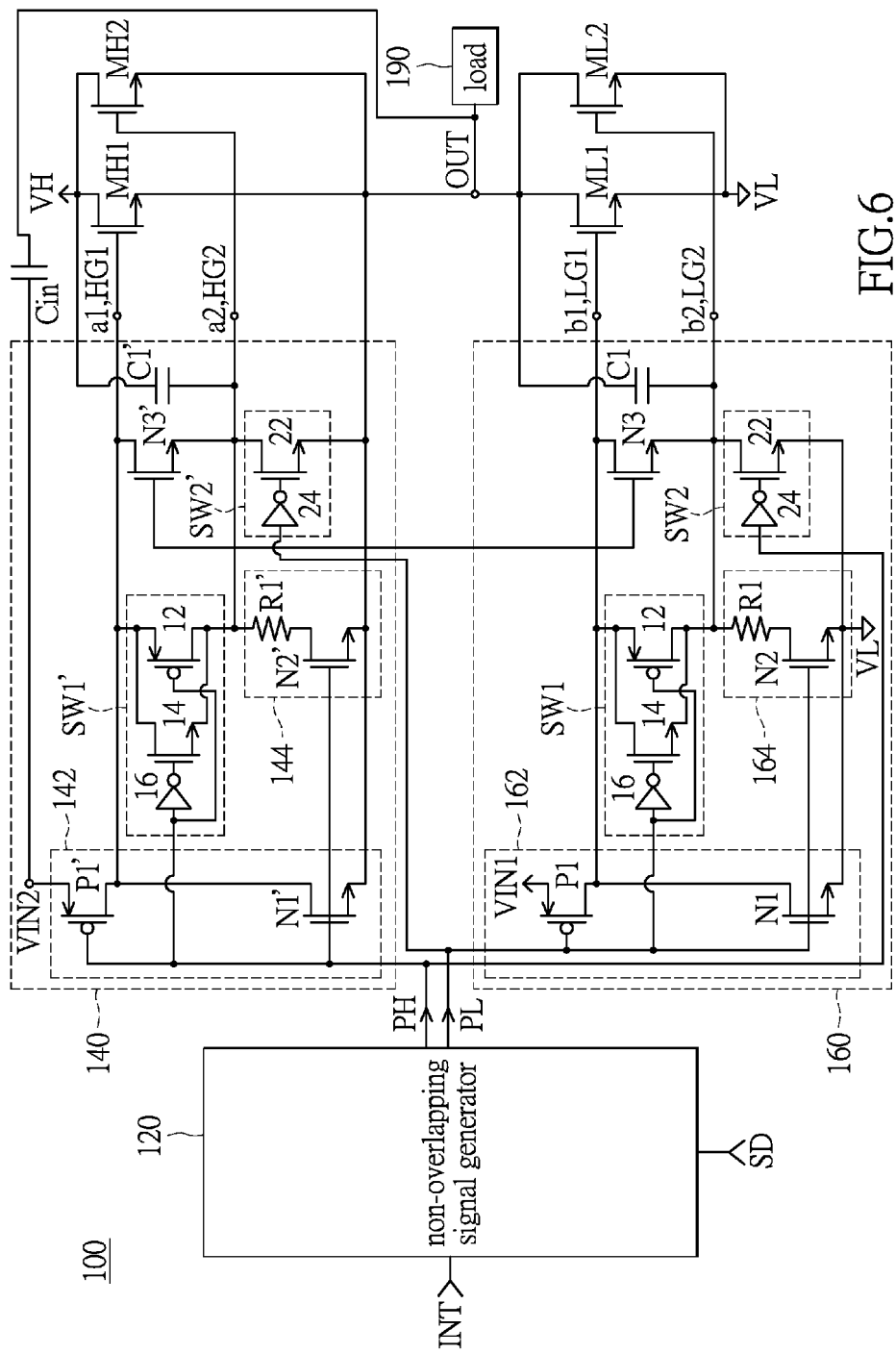
FIG. 6 shows a diagram of a switching driver according to another embodiment of the present disclosure.

As shown in FIG. 6, the high-side driver 140 includes a second capacitor C1', a second low impedance element 142, a second high impedance element 144, and a second short switch SW1'. The second capacitor C1' is coupled between the power end VH and the high-side auxiliary control end a2. The second low impedance element 142 is coupled among the high-side high-voltage end VIN2, the high-side control end a1 and the output end OUT taken as the low voltage reference. The second low impedance element 142 controls the high-side control end a1 connected to the power end VH2 or connected to the output end OUT according to the high-side signal PH. In the present disclosure, the high-side high-voltage end VIN2 is electrically connected to the output end OUT through a capacitor Cin, to take the voltage of the capacitor Cin as the high voltage reference.

This means that when the second low impedance element 142 controls the high-side control end a1 connected to the high-side high-voltage end VIN2 taken as the high voltage reference, the voltage HG1 of the high-side control end a1 increases. Otherwise, when the second low impedance element 142 controls the high-side control end a1 connected to the output end OUT taken as the low voltage reference, the voltage HG1 of the high-side control end a1 decreases. In the present disclosure, the second low impedance element 142 has a third PMOS P1' and a third NMOS N1'. The third PMOS P1' is coupled between the high-side high-voltage end VIN2 and the high-side control end a1. The third NMOS N1' is coupled between the high-side control end a2 and the output end OUT.

More specifically, in the present disclosure, the high-side switch MH1 and the high-side auxiliary switch MH2 are NMOS and the source of the NMOS is connected to the output end OUT. When the high-side switch MH1 and the high-side auxiliary switch MH2 are turned off, the cross voltage between the control end a1 and the source of the high-side switch MH1 and the cross voltage between the control end a2 and the source of the high-side auxiliary switch MH2 are decreased to zero. At this time, the high-side driver 140 takes the output end OUT as the ground end. When the high-side driver 140 turns on the high-side switch MH1 and the high-side auxiliary switch MH2, the voltage of the output end OUT raises to the voltage of the power end VH. Therefore, the high-side high-voltage end VIN2 needs to provide the voltage higher than the voltage of the power end VH to the high-side driver 140. In general, it uses the capacitor Cin crossed over the output end OUT and the high voltage end VIN2. Therefore, when the voltage of the output end OUT is changed, the voltage of the high voltage end VIN2 changes accordingly, thereby fixing the cross voltage between the high voltage end VIN2 and the output end OUT.

The second high impedance element 144 is coupled between the high-side auxiliary control end a2 and the output end OUT. The second high impedance element 144 controls the high-side auxiliary control end a2 connected to the output end OUT, to control the turning on or and turning off of the high-side auxiliary switch MH2. This means that when the second high impedance element 144 controls the high-side auxiliary control end a2 connected to the output end OUT, the voltage HG2 of the high-side auxiliary control end a2 decreases. In the present disclosure, the second high impedance element 144 has a second resistor R1' and a fourth NMOS N2'. An end of the second resistor R1' is coupled to the high-side auxiliary control end a2. Another end of the second resistor R1' is coupled to one end of the fourth NMOS N2'. The other end of the fourth NMOS N2' is coupled to the output end OUT. In other disclosures, the second high impedance element 144 can also have the fourth NMOS N2' only (i.e., removing the second resistor R1'), and the impedance of the fourth NMOS N2' is set higher than the impedance of the third NMOS N1'.

It is worth to note that the impedance of the fourth NMOS N2' is set higher than the impedance of the third NMOS N1'. Therefore, when the high-side signal PH is converted from the low level to the high level (i.e., the pulse width control signal is converted from the high level to the low level), the third NMOS N1' and the fourth NMOS N2' are turned on, to quickly decrease the voltage HG1 of the high-side control end a1 to lower than the turn-on voltage, so as to turn off the high-side switch MH1 completely. The high-side driver 140 detects the descending slope of the voltage of the output end OUT through the second capacitor C1', to control the cut-off velocity of the high-side auxiliary switch MH2. As the descending slope becomes higher, the cut-off velocity becomes slower. Accordingly, when the high-side signal PH is converted from the low level to the high level, the high-side switch MH1 and the high-side auxiliary switch MH2 are turned off at different velocity. More specifically, the method of detecting the descending slope of the voltage of the output end OUT is as follows: when the source voltage (i.e., the output end OUT) of the high-side auxiliary switch MH2 decreases, the voltage HG2 of the high-side auxiliary control end a2 has slower change because of the second capacitor, so that the turn-on degree of the high-side auxiliary switch MH2 is related to the descending slope of the voltage of the output end OUT.

The second short switch SW1' is coupled between the high-side control end a1 and the high-side auxiliary control end a2. The second short switch SW1' adjusts the voltage of the control end a1 of the high-side switch MH1 and the voltage of the control end a2 of the high-side auxiliary switch MH2 according to the high-side signal PH. When the high-side signal PH is the high level, the second short switch SW1' is turned off, so that the high-side switch MH1 and the high-side auxiliary switch MH2 are turned off at different velocity. Otherwise, when the low-side signal PH is the low level, the second short SW1' is turned on, so that the high-side switch MH1 and the high-side auxiliary switch MH2 are turned on at same velocity.

The connection relationship among the second capacitor C1', the second low impedance element 142, the second high impedance element 144, and the second short switch SW1' are substantially same as those among the first capacitor C1, the first low impedance element 162, the first high impedance element 164, and the first short switch SW1. Persons of ordinary skill in this technology field should infer the operation of the second capacitor C1', the second low impedance element 142, the second high impedance element 144, and the second short switch SW1', so detailed description is omitted.

Figure 7:
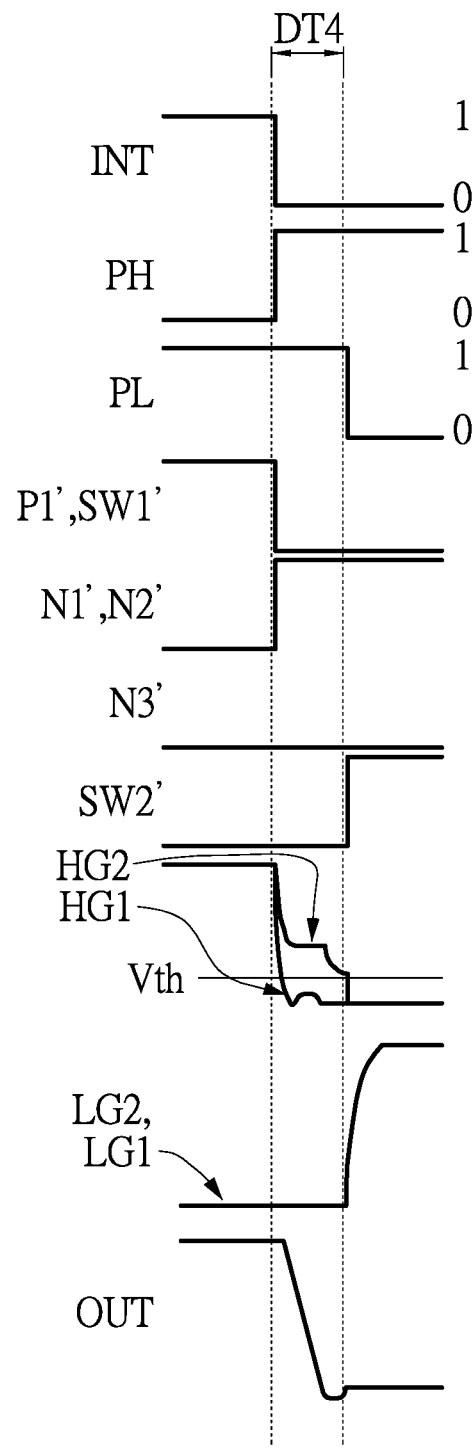
FIG. 7 shows a wave diagram of related signals of the switching driver shown in FIG. 6.

The high-side driver 140 controlling the turning on and turning off of the high-side switch MH1 and the high-side auxiliary switch MH2 while the pulse width control signal is the high level or while the pulse width control signal is converted from the high level to the low level will be described in the following paragraph. Please refer to FIG. 7, which shows a wave diagram of related signals of the switching driver shown in FIG. 6. As shown in FIG. 7, when the pulse width control signal INT is high level, the non-overlapping signal generator 120 generates the high-side signal PH with low level and the low-side signal PL with high level. The high-side driver 160 turns off the low-side switch ML1 and the low-side auxiliary switch ML2 according to the low-side signal PL. The high-side driver 140 turns on the high-side switch MH1 and the high-side auxiliary switch MH2 according to the high-side signal PH. More specifically, the third PMOS P1' and the second short switch SW1' are turned on according to the high-side signal PH with low level, to raise the voltage HG1 of the high-side control end a1 and the voltage HG2 of the low-side auxiliary control end a2, so as to turn on the high-side switch MH1 and the high-side auxiliary switch MH2. At present, the voltage of the output end OUT raises to the high voltage of the power end VH.

When the pulse width control signal INT is converted from the high level to the low level, the non-overlapping signal generator 120 keeps generating the low-side signal PL with the high level and changes to generate the high-side signal PH with the high level. The low-side driver 160 turns off the low-side switch ML1 and the low-side auxiliary switch ML2 for a dead-time DT4, and simultaneously turns on the low-side switch ML1 and the low-side auxiliary switch ML2 after the dead-time according to the low-side signal PL. The high-side driver 140 quickly decreases the voltage HG1 of the high-side control end a1 to less than the turn-on voltage Vth according to the high-side signal PH, to turn off the high-side switch MH1. The high-side driver 140 detects the descending slope of the voltage of the output end OUT through the second capacitor C1', to control the cut-off velocity of the high-side auxiliary switch MH2. As the descending slope becomes higher, the cut-off velocity becomes slower. This means that the velocity of gradually turning off the high-side auxiliary switch MH2 is related to the descending slope of the voltage of the output end OUT.

More specifically, when the pulse width control signal INT is converted from the high level to the low level, the third NMOS N1' of the second low impedance element 142 and the fourth NMOS N2' of the second high impedance element 144 are turned on according to the high-side signal PH with high level. At this time, the output end OUT connects to the high-side control a1, to quickly decrease the voltage HG1 of the high-side control end a1 to less than the turn-on voltage Vth of the high-side switch MH1. The output end OUT connects to the high-side auxiliary control end a2, to gradually decrease the voltage HG2 of the high-side auxiliary control end a2 according to the current of the second capacitor Cr.

It is worth to note that the voltage HG1 of the high-side control end a1 quickly decreases to the turn-on voltage Vth of the high-side switch MH1, to turn off the high-side switch MH1 during the dead-time DT4. At this time, the equivalent impedance of the high-side switch MH1 substantially increases. It is not enough to support the load current flowing out of the output end OUT. Therefore, the output end OUT will be discharged by the load current to quickly decrease the voltage. The descending slope of the voltage of the output end OUT will be detected by the second capacitor C1', to influence the descending velocity of the voltage HG2 of the high-side auxiliary control end a2. At this time, the high-side auxiliary switch MH2 is not yet completely turned off, so as to provide the discharge path for the portion of the load current and a resistive load for consuming energy in the parasitic LC network of the output end OUT. Accordingly, the voltage of the output end OUT decreases to the low voltage of the ground end VL at relatively low velocity (i.e., the voltage of the output end OUT generates less EMI effect because of the slower slew rate) and the high frequency oscillation at the output end OUT can also be inhibited.

In addition, the second short switch SW1' is turned on during the high-side signal PH to be converted from the high level to the low level (as shown in FIG. 4). This means that when the pulse width control signal INT is converted from the low level to the high level, the second short switch SW1' is turned off for the dead-time DT3 and then turned on to simultaneously raise the voltage HG1 of the high-side control end a1 and the voltage HG2 of the high-side auxiliary control end a2, so as to simultaneously turn on the high-side switch MH1 and the high-side auxiliary switch MH2. Accordingly, when the pulse width control signal INT is converted from the low level to the high level and keeps the high level for the dead-time, the second short switch SW1' can ensure that the high-side switch MH1 and the high-side auxiliary switch MH2 are simultaneously turned on.

In other disclosures, the high-side driver 140 includes a second auxiliary cut-off switch SW2'. The second auxiliary cut-off switch SW2' is coupled between the high-side auxiliary control end a2 and the output end OUT. In the present disclosure, the second auxiliary cut-off switch SW2' is composed of an NMOS and a NOT gate. With respect to internal components of the second auxiliary cut-off switch SW2', they are the same as that of the first auxiliary cut-off switch SW2, so detailed description is omitted. Please refer to FIG. 7, after the pulse width control signal INT is converted from the high level to the low level and keeps the low level for the dead-time DT4, the second auxiliary cut-off switch SW2' is turned on according to the low-side signal PL with the low level, to decrease the voltage HG2 of the high-side auxiliary switch a2 to less than the turn-on voltage Vth of the high-side auxiliary switch MH2, so as to turn off the high-side auxiliary switch MH2. Accordingly, when the low-side driver 160 turns on the low-side switch ML1 and the low-side auxiliary switch ML2 (i.e., after the dead-time DT4), the second auxiliary cut-off switch SW2' can avoid the high-side auxiliary switch MH2 still operating in the turn-on state, causing the shoot-through current from the power end VH to the ground end VL.

In other disclosures, the high-side driver circuit 140 includes a second protection switch N3'. The second protection switch N3' is coupled between the high-side control end a1 and the high-side auxiliary control end a2, to simultaneously turn off the high-side switch MH1 and the high-side auxiliary switch MH2 according to the close signal SD.

In the present disclosure, the close signal SD is generated from the abnormal condition of the system, such as the shutdown signal, the overcurrent signal, the overvoltage signal, or over-temperature protection. Therefore, when the abnormal condition occurs to the system, the close signal SD is converted to the high level, the non-overlapping signal generator 120 generates the high-side signal PH with high level and the low-side signal PL with high level according to the close signal SD with high level, to turn off the high-side switch MH1 and the high-side auxiliary switch MH2. At this time, the second protection switch N3' is turned on according to the close signal SD with high level, so that the voltage HG1 of the high-side control end a1 and the voltage HG2 of the high-side auxiliary control end a2 quickly decrease to less than the cut-off voltage by the same velocity through the third NMOS N1' configured in the low impedance path. Therefore, when the abnormal condition occurs, the switching driver 100 turns off the high-side switch MH1 and the high-side auxiliary switch MH2 immediately.

In summary, the present disclosure provides the switching driver capable of reducing EMI effect and power ripple. When the switching driver wants to increase the voltage of the output end, the low-side driver quickly turns off the low-side switch, and detects the ascending slope of the voltage of the output end to control the cut-off velocity of the low-side auxiliary switch. When the switching driver wants to decrease the voltage of the output end, the high-side driver quickly turns off the high-side switch, and detects the descending slope of the voltage of the output end to control the cut-off velocity of the high-side auxiliary switch. Accordingly, the switching driver can reduce EMI effect and power ripple operating in the dead-time.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A switching driver capable of reducing EMI effect and power ripple, coupled to a load through an output end, and the switching driver comprising:
    a non-overlapping signal generator, configured for generating a high-side signal and a low-side signal according to a pulse width control signal;
    a high-side switch, coupled between a power end and the output end, and having a high-side control end;
    a high-side auxiliary switch, connected in parallel to the high-side switch, and having a high-side auxiliary control end;
    a low-side switch, coupled between the output end and a ground end, and having a low-side control end;
    a low-side auxiliary switch, connected in parallel to the low-side switch, and having a low-side auxiliary control end;
    a high-side driver, coupled among the non-overlapping signal generator, the power end, the high-side control end, and the high-side auxiliary control end; and
    a low-side driver, coupled among the non-overlapping signal generator, the output end, the low-side control end, and the low-side auxiliary control end;
    wherein when the pulse width control signal is low level, the high-side driver turns off the high-side switch and the high-side auxiliary switch according to the high-side signal, the low-side driver turns on the low-side switch and the low-side auxiliary switch according to the low-side signal;
    wherein when the pulse width control signal is converted from the low level to a high level, the high-side driver turns off the high-side switch and the high-side auxiliary switch for a dead-time, and simultaneously turns on the high-side switch and the high-side auxiliary switch after the dead-time according to the high-side signal, the low-side driver decreases the voltage of the low-side control end to less than a turn-on voltage to turn off the low-side switch according to the low-side signal, and detects an ascending slope of the voltage of the output end to control a cut-off velocity of the low-side auxiliary switch, and as the ascending slope becomes higher, the cut-off velocity of the low-side auxiliary switch becomes slower;
    wherein the low-side driver comprises:
        a first capacitor, coupled between the output end and the low-side auxiliary control end;
        a first low impedance element, coupled among a low-side high-voltage end, the low-side control end, and the ground end, and configured for controlling the low-side control end connected to the low-side high-voltage end or connected to the ground end according to the low-side signal;
        a first high impedance element, coupled between the low-side auxiliary control end and the ground end, and configured for controlling the low-side auxiliary control end connected to the ground end according to the low-side signal; and
        a first short switch, coupled between the low-side control end and the low-side auxiliary control end, and configured for adjusting the voltage of the low-side control end and the voltage of the low-side auxiliary control end according to the low-side signal;
    wherein when the pulse width control signal is converted from the low level to the high level, the first low impedance element connects to the ground end and the low-side control end, to decrease the voltage of the low-side control end to a low voltage, the first high impedance element connects to the ground end and the low-side auxiliary control end, to decrease the voltage of the low-side auxiliary control end according to the ascending slope of the voltage of the output end detected from the first capacitor;
    wherein when the pulse width control signal is converted from the high level to the low level, the first short switch is turned off for the dead-time and then turned on, to simultaneously raise the voltage of the low-side control end and the voltage of the low-side auxiliary control end.

2. The switching driver according to claim 1, wherein the first low impedance element has a first PMOS and a first NMOS, the first PMOS is coupled between the low-side high-voltage end and the low-side control end, and the first NMOS is coupled between the low-side control end and the ground end, wherein when the low-side signal is high level, the first PMOS is turned off and the first NMOS is turned on to connect the low-side control end and the ground end, and when the low-side signal is low level, the first NMOS is turned off and the first PMOS is turned on to connect the low-side control end and the low-side high-voltage end.

3. The switching driver according to claim 2, wherein the first high impedance element is a second NMOS, the impedance of the second NMOS is higher than the impedance of the first NMOS, wherein when the low-side signal is high level, the second NMOS is turned on to connect the low-side auxiliary control end and the ground end, and when the low-side signal is low level, the second NMOS is turned off to cut off the low-side auxiliary control end and the ground end.

4. The switching driver according to claim 1, wherein the first high impedance element has a first resistance and a second NMOS, an end of the first resistance is coupled to the low-side auxiliary control end, another end of the first resistance is coupled to an end of the second NMOS, and another end of the second NMOS is coupled to the ground end, wherein when the low-side signal is high level, the second NMOS is turned on to connect the low-side auxiliary control end and the ground, and when the low-side signal is low level, the second NMOS is turned off to cut off the low-side auxiliary control end and the ground end.

5. The switching driver according to claim 1, wherein the low-side driver further comprises a first auxiliary cut-off switch, the first auxiliary cut-off switch is coupled between the low-side auxiliary control end and the ground end, when the pulse width control signal is converted from the low level to the high level for the dead-time, the first auxiliary cut-off switch is turned on to decrease the voltage of the low-side auxiliary control end to less than the turn-on voltage to turn off the low-side auxiliary switch according to the high-side signal.

6. The switching driver according to claim 1, wherein the low-side driver further comprises a first protection switch, the first protection switch is coupled between the low-side control end and the low-side auxiliary control end, and the first protection switch is turned on according to a close signal, to simultaneously decrease the voltage of the low-side control end and the voltage of the low-side auxiliary control end to turn off the low-side switch and the low-side auxiliary switch.

7. The switching driver according to claim 1, wherein when the pulse width control signal is high level, the low-side driver turns off the low-side switch and the low-side auxiliary switch according to the low-side signal, and the high-side driver turns on the high-side switch and the high-side auxiliary switch according to the high-side signal;
when the pulse width control signal is converted from the high level to the low level, the low-side driver turns off the low-side switch and the low-side auxiliary switch for the dead-time and simultaneously turns on the low-side switch and the low-side auxiliary switch after the dead-time according to the low-side signal, the high-side driver decreases the voltage of the high-side control end to less than the turn-on voltage to turn off the high-side switch according to the high-side signal, and detects a descending slope of the voltage of the output end to control a cut-off velocity of the high-side auxiliary switch, as the descending slope becomes higher, the cut-off velocity of the high-side auxiliary switch becomes slower.

8. The switching driver according to claim 7, wherein the high-side driver comprises:
a second capacitor, coupled between the power end and the high-side auxiliary control end;
a second low impedance element, coupled among a high-side high-voltage end, the high-side control end, and the output end, and configured for controlling the high-side control end connected to the high-side high-voltage end or the output end according to the high-side signal;
a second high impedance element, coupled between the high-side auxiliary control end and the output end, and configured for controlling the high-side auxiliary control end connected to the output end according to the high-side signal; and
a second short switch, coupled between the high-side control end and the high-side auxiliary control end, and configured for adjusting the voltage of the high-side control end and the voltage of the high-side auxiliary control end according to the high-side signal;

wherein when the pulse width control signal is converted from the high level to the low level, the second low impedance element is connected to the output end and the high-side control end, to decrease the voltage of the high-side control end to a low voltage, the second high impedance element is connected to the output end and the high-side auxiliary control end to decrease the voltage of the high-side auxiliary control end according to the descending slope of the voltage of the output end detected from the second capacitor;
wherein when the pulse width control signal is converted from the low level to the high level, the second short switch is turned off for the dead-time and then turned on, to simultaneously raise the voltage of the high-side control end and the voltage of the high-side auxiliary control end.

9. The switching driver according to claim 7, wherein the second low impedance element has a third PMOS and a third NMOS, the third PMOS is coupled between the high-side control end and the output end, and the third NMOS is coupled between the high-side control end and the output end, when the high-side signal is high level, the third PMOS is turned off and the third NMOS is turned on, to connect the high-side control end and the output end, and when the high-side signal is low level, the third NMOS is turned off and the third PMOS is turned on, to connect the high-side control end and the high-side high-voltage end.

10. The switching driver according to claim 9, wherein the second high impedance element is a fourth NMOS, the impedance of the fourth NMOS is higher than the impedance of the third NMOS, wherein when the high-side signal is high level, the fourth NMOS is turned on to connect the high-side auxiliary control end and the output end, and when the high-side signal is low level, the fourth NMOS is turned off to cut off the high-side auxiliary control end and the output end.

11. The switching driver according to claim 8, wherein the second high impedance element has a second resistor and a fourth NMOS, an end of the second resistor is coupled to the high-side auxiliary control end, another end of the second resistor is coupled to an end of the fourth NMOS, and another end of the fourth NMOS is coupled to the output end, wherein when the high-side signal is high level, the fourth NMOS is turned on to connect the high-side auxiliary control end and the output end, and when the high-side signal is low level, the fourth NMOS is turned off to cut-off the high-side auxiliary control end and the output end.

12. The switching driver according to claim 8, wherein the high-side driver further comprises a second auxiliary cut-off switch, the second auxiliary cut-off switch is coupled between the high-side auxiliary control end and the output end, when the pulse width control signal is converted from the high level to the low level for the dead-time, the second auxiliary cut-off switch is turned on according to the low-side signal, to decrease the voltage of the high-side auxiliary control end to less than the turn-on voltage, to turn off the high-side auxiliary switch.

13. The switching driver according to claim 8, wherein the high-side driver further comprises a second protection switch, the second protection switch is coupled between the high-side control end and the high-side auxiliary control end, and the second protection switch is turned on according to a close signal, to simultaneously decrease the voltage of the high-side control end and the voltage of the high-side auxiliary control end to turn off the high-side switch and the high-side auxiliary switch.

* * * * *